Feb. 22, 1966  A. J. ECKMAN  3,236,537
COLLAPSIBLE TRAIL CART
Filed Jan. 29, 1963  3 Sheets-Sheet 1
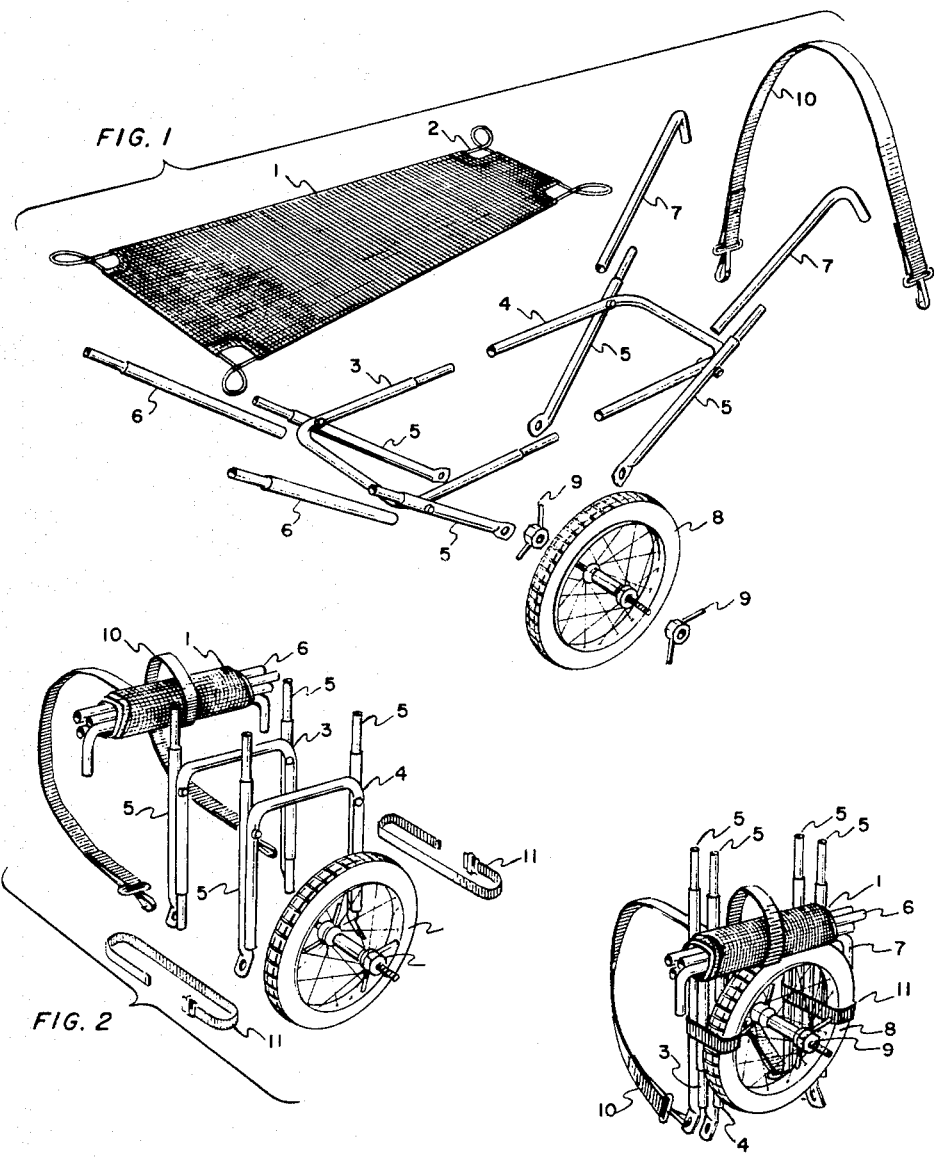
INVENTOR.
ALFRED J. ECKMAN
BY *Robert R. Finch*
   *Attorney*

Feb. 22, 1966  A. J. ECKMAN  3,236,537
COLLAPSIBLE TRAIL CART
Filed Jan. 29, 1963  3 Sheets-Sheet 2

INVENTOR.
ALFRED J. ECKMAN

Feb. 22, 1966     A. J. ECKMAN     3,236,537
COLLAPSIBLE TRAIL CART

Filed Jan. 29, 1963     3 Sheets-Sheet 3

INVENTOR.
ALFRED J. ECKMAN
BY *Robert R. Finch*
    *attorney*

United States Patent Office 3,236,537
Patented Feb. 22, 1966

3,236,537
COLLAPSIBLE TRAIL CART
Alfred J. Eckman, 760 South 7th West,
Salt Lake City 4, Utah
Filed Jan. 29, 1963, Ser. No. 255,154
3 Claims. (Cl. 280—47.18)

This invention relates to an improvement in a means of manually transporting small loads or persons up to a maximum weight of approximately 300 pounds over difficult terrain, narrow trails and over various distances. More specifically it can be described as a hammock-type stretcher suspended on a collapsible and convertible structure which is supported by a single wheel, thus representing itself as a one-wheel vehicle or cart. Depending on the circumstances it can be used and operated by two persons—one on each end—or by one person after a simple conversion.

Furthermore this cart can be quickly disassembled without the use of any tools and carried as a compact pack by an average normal adult with little effort on his back, leaving his arms and hands available for other activities. With this it seems reasonably established that this invention is a convertible cart which can carry and can be carried.

The following description of the accompanying drawings will more completely describe the above features as well as its components, their functions and other features and advantages.

FIGURE 1 is a perspective of the disassembled carry-cart showing its components.

FIGURE 2 is a perspective showing the procedure for arranging the individual components for assembly as a small compact unit or pack, as it can be carried by an average normal person on the back.

FIGURE 3 is a perspective of the assembled pack.

Figure 4:
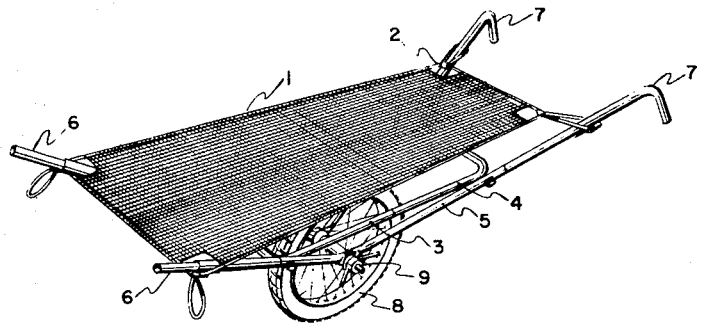
FIGURE 4 is a perspective of the assembled carry-cart as it is used and operated by two persons.

The carry-cart is constructed from three major components: a hammock, serving as the load carrier, the suspension structure and the wheel. Referring to FIGURE 1, showing the components of the convertible carry-cart the load carrier appears as a trapezoid-shaped hammock 1, sewn onto a steel cable 2 around its four edges leaving an opening in each corner where the steel cable is exposed to complete the corner and at the same time form a loop.

The wheel 8 is a heavy duty bicycle-type wheel of approximately 20" diameter, with tire and innertube, wire spokes and steel axle on ball bearings. To connect the wheel rigidly to the suspension structure two special-type wing nuts 9 are used which do not require the use of a wrench.

The components of the suspension structure, 3 to 7, are made of metal pipe, four metal bolts with nuts and washers and four metal hooks, which are welded to the extensions 6 and 7. By slipping two U-shaped pipe sections 3 and 4 onto each other a rectangular frame is formed. In each of the four corners of this frame 3 and 4, one of the four wheel-suspension legs is bolted on at an angle, to permit it to swivel into position on the end of the axle of the wheel or fold parallel to the frame 3 and 4, as shown in FIG. 2.

The wheel-suspension legs 5 are flattened at their lower ends and drilled to receive the ends of the axle. The assembly of the frame 3 and 4 and the attachment of the four suspension legs 5, two to each end of the wheel axle where they are held in position by the wing nuts 9, completes the wheel suspension.

To complete the suspension structure for the hammock 1 or load carrier for use and operation of the carry-cart by two persons the extensions 6 and 7 are slipped on the free upper ends of the suspension legs 5 as in FIGS. 1 and 4.

Figures 7, 8:
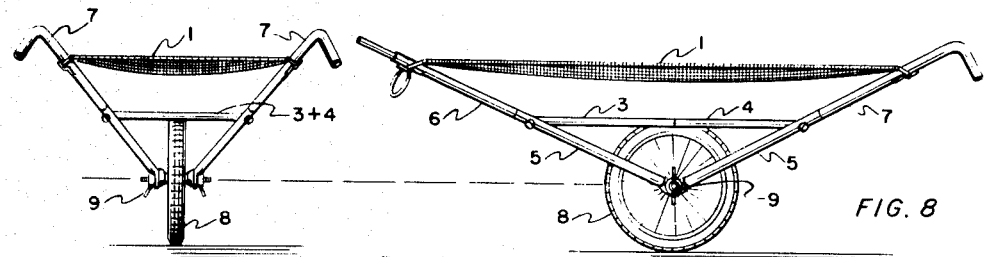
FIGURE 7 shows a front view of the carry-cart, assembled for the use and operation by two persons.
FIGURE 8 shows a side view of the carry-cart assembled for the use and operation by two persons.
Figure 9:
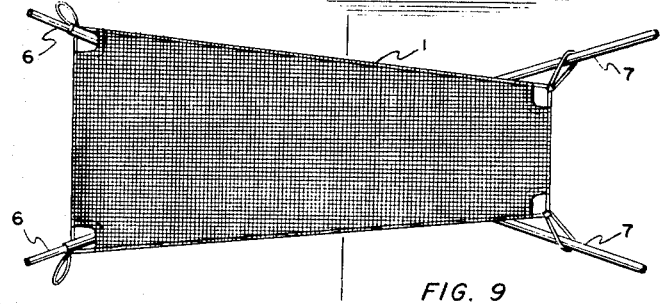
FIGURE 9 shows a top view of the carry-cart assembled for the use and operation by two persons.

To bring the load carrier into position, the extensions 6 are stuck through the corner openings on the wider end of the hammock 1 and the steel cable 2 slipped into the hooks which are welded to the extensions. The extensions 7 are stuck through the cable loops on the narrow end of the hammock and the cable loops slipped onto the hooks which are welded to the extensions 7. The free ends of the extensions 6 and 7 serve as handles for operation of the now assembled carry-cart by two persons, one on each end. The extensions 7 are curved as shown in FIGS. 1 and 8 to provide a more efficient grip to pull the cart.

The hammock is stretched tightly in the assembled position and serves as an integral part of the structure by holding the extensions 6 and 7 in place and the frame 3 and 4 in its assembled position even more securely as more of the load is applied to the hammock. The approximate center of gravity of the applied load to be transported in the manner of assembly described above for the use and operation of the carry-cart by two persons is balanced "unstable" over the wheel axle while the carry-cart is held in its upright position by the operators with little effort.

Figure 5:
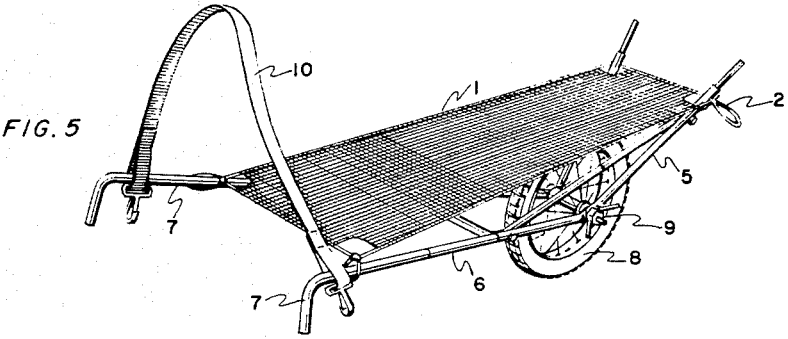
FIGURE 5 is a perspective of the assembled carry-cart converted for the use and operation by one person only.
Figure 10:
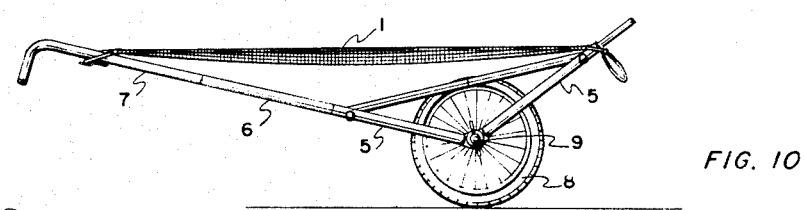
FIGURE 10 shows a side view of the carry-cart assembled and converted for use and operation by one person.
Figure 11:
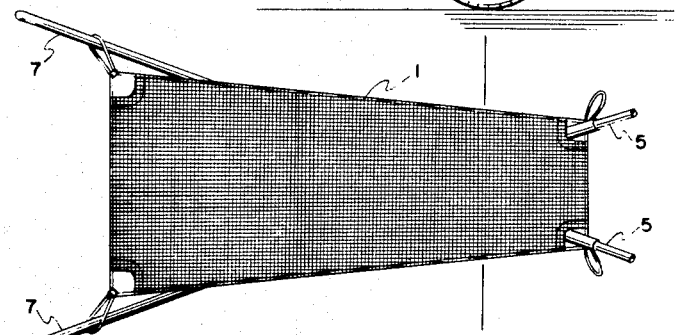
FIGURE 11 shows a top view of the carry-cart assembled for operation by one person.

For the use and operation of the carry-cart by one person the extensions 6 are slipped onto the suspension legs 5 and the extensions 7 onto the extensions 6 as shown in FIGS. 5, 10 and 11. The two free ends of the suspension legs 5 are stuck through the corner openings of the narrow end of the hammock and the extensions 7 through the cable loops on the wider end of the hammock. After the cable corners are slipped onto the hooks welded to the extensions 7 assembly of the converted version of the carry-cart is completed for use and operation by one person only. This version of assembly shifts the hammock and with it the center of gravity of the load to lie between the wheel axle and the free ends of the extensions 7 which serve as handles for the operator of the cart assuring a more stable balance of the cart based on the principle of the wheelbarrow.

The strap 10 with loops and snaphooks on each end is to assist the operator in carrying the weight of the load. For this purpose, the loops of the strap are slipped over the curved ends of the extensions 7 and the strap wrapped around the shoulders and neck of the operator thus distributing the weight of the load and relieving his hands and arms of most of the weight.

Figure 6:
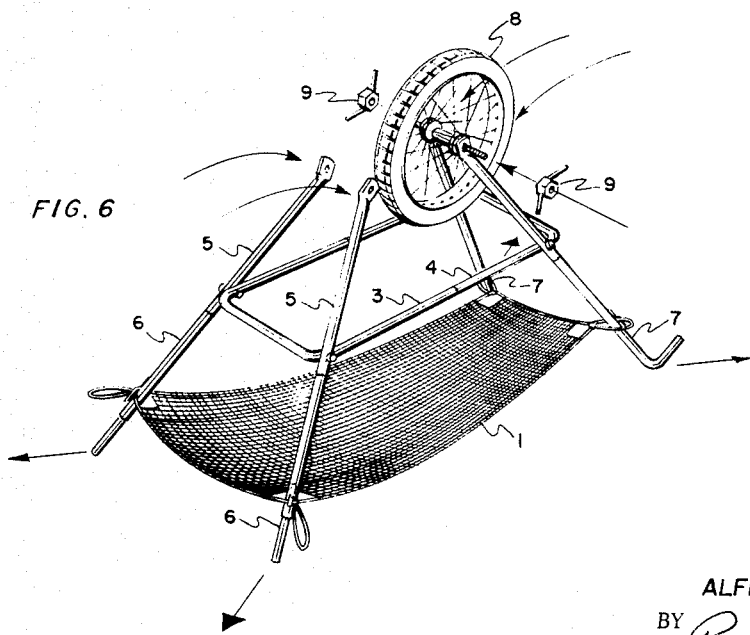
FIGURE 6 is a perspective showing the manner of assembly of the carry-cart for the use and operation by two persons. The assembly of the same for the operation by one person is performed in a simular manner.

FIGURE 6 shows the principle of assembly in order to achieve the tightly stretched suspension of the hammock. After assembling the frame, 3 and 4, and bringing the extensions 6 and 7 into their positions for either one of the manners of assembly described above, the hammock 1 is brought into its position by slipping the steel cable loops or the steel cable exposed in the corner openings of the hammock onto the hooks on the extensions 6 and 7 respectively. The axle of the wheel then is slipped through the holes at the flattened ends of the suspension legs 5 as indicated by the arrows in FIG. 6 and the wing nuts 9 screwed onto the ends of the wheel axle firmly. This way the hammock is tightly stretched between the extensions 6 and 7, or between the extensions 7 and the free ends of the wheel suspension legs 5, depending on which version of the carry-cart is being assembled.

FIGURE 2 shows the arrangement of the disassembled components of the carry-cart as they are packed into a compact unit to be carried as a pack. To achieve this, the wheel suspension legs 5 are swiveled and folded parallel to the U-shaped frame sections 3 and 4 which have been disassembled and stacked in horizontal position on top of each other. The wheel 8 is placed on top of both frame sections and all three components strapped together tightly with the two buckle straps 11 as shown in FIGS. 3. The extensions 6 and 7 are rolled into the hammock 1 and placed on top of the wheel against the cross members of the U-shaped frame sections 3 and 4. The strap 10 now is wrapped around the hammock roll and the cross members of the frame section. The snaphooks at the ends of the strap are hooked on each side into the holes at the flat end of the wheel suspension legs 5 as shown in FIG. 3. The two loops formed by the strap 10 are placed on and around the shoulders of the person carrying the carry-cart as a pack on his back leaving the arms and hands available for other activities.

Although I have described the principles of construction, function and operation of my invention in a preferred embodiment thereof, it is to be understood that obvious changes may be made within the scope of the following claims without departing from the spirit of my invention.

I claim:

1. A portable load-carrying vehicle comprising in combination a collapsible wheeled-frame formed from a pair of rigid U-shaped members joined together at their legs to form a rigid rectangle, four rigid elongated support members each pivotally connected adjacent one end to a corner of said rectangle to be movable into and out of parallel relationship with a side of said rectangle, a single wheel-carrying axle, means at the other end of each of said support members enabling detachable connection of said members to said single axle whereby to detachably mount and fixedly position said axle with respect to said frame, a first pair of elongated handle members detachably connectable to said one ends of said support members to form extensions thereof adjacent the corners at one end of said rectangle, a second pair of elongated handle members detachably connectable selectively to said one ends of said support members at the corners of the other end of said rectangle and to said first handle members to form extensions thereof, and a four cornered load carrying member detachably connectable at two of its corners to the members of one of said pairs of handle members and at the other two of its corners selectively to the members of said other pair of said handle members and to said one ends of said support members adjacent the corners at one end of said rectangle.

2. A portable load-carrying vehicle comprising in combination a collapsible wheeled frame formed from a pair of rigid U-shaped tubular members telescopingly joined together at their legs to form a rigid rectangle, four rigid elongated support members each pivotally connected adjacent one of its ends to a corner of said rectangle to be movable into and out of parallel relationship with a side of said rectangle, an axle carrying a single wheel, means at the other end of each of said support members enabling detachable connection of said members to said axle whereby to detachably mount and fixedly position said axle and said single wheel with respect to said frame, a first pair of elongated handle members detachably connectable to said one end of said support members to form extensions thereof adjacent the corners at a selected end of said rectangle, a second pair of elongated handle members detachably connectable selectively to said one end of said support members to form extensions thereof adjacent the corners of the other end of said rectangle and to said first handle members to form extensions thereof, a trapezoidal shaped load-carrying member narrower at one end than at the other, connecting means at each corner of said fabric member adapted to detachably engage complemental connecting means on each member of said first and second pairs of elongated handle members.

3. A portable load-carrying vehicle according to preceding claim 2 in which said connecting means at least at the narrow end corners of said trapezoidal shaped load-carrying member include means for detachably connecting said corners to said one ends of said support members adjacent the corners at one end of said rectangle.

References Cited by the Examiner

UNITED STATES PATENTS

| | | | |
|---|---|---|---|
| 922,841 | 5/1909 | Bernstein | 296—20 |
| 2,123,268 | 7/1938 | Young | 5—122 X |
| 2,546,604 | 3/1951 | Lafky | 296—20 |
| 2,629,608 | 2/1953 | Jones | 280—47.3 X |
| 2,789,829 | 4/1957 | Parker | 280—47.18 X |
| 2,811,367 | 10/1957 | Goodale | 280—43.1 X |
| 2,843,393 | 7/1958 | Dahlander | 280—47.18 |
| 2,918,296 | 12/1959 | Goodale | 280—47.3 X |
| 2,979,338 | 4/1961 | Dwyer | 280—47.3 |
| 3,054,622 | 9/1962 | Davis et al. | 280—47.3 X |

BENJAMIN HERSH, *Primary Examiner.*

A. HARRY LEVY, *Examiner.*